United States Patent
McCreary, Jr. et al.

(10) Patent No.: US 10,386,039 B2
(45) Date of Patent: Aug. 20, 2019

(54) LUMINAIRE ASSEMBLIES WITH COMPOSITE HOUSINGS

(71) Applicant: Quarkstar LLC, Las Vegas, NV (US)

(72) Inventors: Charles R. McCreary, Jr., Kilgore, TX (US); Ferdinand Schinagl, North Vancouver (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 15/313,534

(22) PCT Filed: May 28, 2015

(86) PCT No.: PCT/US2015/032846
§ 371 (c)(1),
(2) Date: Nov. 22, 2016

(87) PCT Pub. No.: WO2015/184074
PCT Pub. Date: Dec. 3, 2015

(65) Prior Publication Data
US 2017/0198881 A1    Jul. 13, 2017

Related U.S. Application Data

(60) Provisional application No. 62/087,570, filed on Dec. 4, 2014, provisional application No. 62/081,506, filed
(Continued)

(51) Int. Cl.
*F21V 7/00* (2006.01)
*F21V 8/00* (2006.01)
(Continued)

(52) U.S. Cl.
CPC .............. *F21V 7/0016* (2013.01); *F21K 9/61* (2016.08); *F21V 7/0008* (2013.01); *F21V 15/01* (2013.01);
(Continued)

(58) Field of Classification Search
CPC ........ F21V 7/0016; F21V 7/0008; F21K 9/61; G02B 6/0091; G02B 6/0055; G02B 6/0068
See application file for complete search history.

(56) References Cited

U.S. PATENT DOCUMENTS

| | | | |
|---|---|---|---|
| 8,537,554 B1 * | 9/2013 | Hockaday | H01L 31/0521 136/246 |
| 2009/0316414 A1 * | 12/2009 | Yang | F21V 7/0008 362/296.01 |

(Continued)

FOREIGN PATENT DOCUMENTS

WO    WO2013087373 A1    6/2013

OTHER PUBLICATIONS

International Application No. PCT/US2015/032846, Notification of Transmittal of the International Search Report and the Written Opinion of the International Searching Authority, dated Oct. 27, 2015, 17 pages.

*Primary Examiner* — Karabi Guharay
(74) *Attorney, Agent, or Firm* — Fish & Richardson P.C.

(57) ABSTRACT

A luminaire assembly includes a substrate; light emitting elements (LEEs) secured to the substrate; optical couplers arranged along the substrate, each optical coupler being positioned to receive light emitting from a corresponding one of the LEEs and to direct the light in a forward direction orthogonal to the substrate; a redirecting surface spaced apart from the couplers along the forward direction to reflect the light from the optical couplers to an ambient environment in a backward angular range; a housing comprising a support structure and a layer of a heat conducting material disposed on the support structure, where a thermal conductivity of the layer of heat conducting material is greater than a thermal conductivity of a material forming the support structure; and a heat coupling layer arranged between the
(Continued)

substrate and the housing, the heat coupling layer being adjacent to the heat conducting material of the housing.

8 Claims, 8 Drawing Sheets

Related U.S. Application Data on Nov. 18, 2014, provisional application No. 62/003,766, filed on May 28, 2014.

(51) Int. Cl.
*F21V 15/01* (2006.01)
*F21V 29/85* (2015.01)
*F21V 29/87* (2015.01)
*F21V 29/70* (2015.01)
*F21K 9/61* (2016.01)
*F21Y 103/10* (2016.01)
*F21Y 115/10* (2016.01)
*F21Y 115/00* (2016.01)

(52) U.S. Cl.
CPC .............. *F21V 29/70* (2015.01); *F21V 29/85* (2015.01); *F21V 29/87* (2015.01); *G02B 6/0023* (2013.01); *G02B 6/0031* (2013.01); *G02B 6/0055* (2013.01); *G02B 6/0068* (2013.01); *G02B 6/0085* (2013.01); *G02B 6/0088* (2013.01); *G02B 6/0091* (2013.01); *G02B 6/0093* (2013.01); *F21Y 2103/10* (2016.08); *F21Y 2115/00* (2016.08); *F21Y 2115/10* (2016.08)

(56) References Cited

U.S. PATENT DOCUMENTS

2013/0039050 A1* 2/2013 Dau .................... G02B 6/0045
362/218
2014/0126235 A1 5/2014 Speier et al.
2015/0211710 A1* 7/2015 Speier ...................... F21S 8/04
362/606

* cited by examiner

LUMINAIRE ASSEMBLIES WITH COMPOSITE HOUSINGS

CROSS-REFERENCE TO RELATED APPLICATIONS

This application is a U.S. National Phase application of International Application No. PCT/US2015/032846, filed on May 28, 2015, which claims the benefit of priority under 35 U.S.C. § 119(e)(1) of U.S. Provisional Application No. 62/003,766, filed on May 28, 2014, of U.S. Provisional Application No. 62/081,506, filed on Nov. 18, 2014, and of U.S. Provisional Application No. 62/087,570, filed on Dec. 4, 2014, all of which are incorporated by reference herein.

TECHNOLOGICAL FIELD

The present technology relates to luminaire assemblies, and more particularly to luminaire assemblies having composite housings.

BACKGROUND

Light sources are used in a variety of applications, such as for providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

Solid state light emitting elements (LEEs), such as light emitting diodes, may be subject to substantial heating during their operation. Thus, luminaire assemblies that incorporate such elements commonly feature components that facilitate dispersion of the heat generated by the LEEs. In particular, solid state luminaires often feature a heat sink to which heat from the LEEs is dissipated and dispersed. In this specification, luminaire assemblies are described that feature housings that concurrently provide a heat sink function to extract and dissipate heat generated by the LEEs during operation and a support function to support multiple components of the luminaire assemblies. A combination of materials is disclosed so a housing fabricated from the disclosed combination can effectively perform the above noted functions while maintaining a low mass-to-surface area ratio for the fabricated housing.

Various aspects of the disclosed technologies are summarized as follows.

In general, in a first aspect, a luminaire assembly includes: a substrate extending along a first direction comprising a first material having a first coefficient of thermal expansion; a plurality of light emitting elements secured to the substrate, the light emitting elements being arranged along the first direction; a light guide comprising a material having a second coefficient of thermal expansion different from the first coefficient of thermal expansion over an operating temperature range; a plurality of optical elements arranged along the first direction, each optical element being positioned to receive light emitted from a corresponding one or more of the light emitting elements and to direct the light to an edge of the light guide; a housing that includes a portion composed of a polymer and a layer comprising a metal disposed on the polymer portion; and a heat coupling layer arranged between the substrate and the housing. Here, the substrate and the heat coupling layer are constructed so that each of the plurality of light emitting elements, while secured to the substrate, remain registered with their corresponding optical element over the operating temperature range.

Embodiments of the luminaire assembly may include one or more of the following features and/or features of other aspects. In some implementations, the housing can include a support structure and the layer comprising the metal is disposed on the support structure. In some cases, the layer that includes the metal is adjacent the heat transfer layer.

In some implementations, the light emitting elements can be light-emitting diodes. For example, the light-emitting diodes are white light-emitting diodes.

In some implementations, the luminaire assembly can extend about six inches or more in the first direction. In some implementations, the luminaire assembly can extend about 12 inches or more in the first direction. In some implementations, the luminaire assembly can extend about 24 inches or more in the first direction. In some implementations, the luminaire assembly can extend about 48 inches or more in the first direction.

In general, in another aspect, a luminaire assembly includes: a substrate extending along a first direction comprising a first material having a first coefficient of thermal expansion; a plurality of light emitting elements secured to the substrate, the light emitting elements being arranged along the first direction; a light guide comprising a material having a second coefficient of thermal expansion different from the first coefficient of thermal expansion over an operating temperature range; a plurality of optical elements arranged along the first direction, each optical element being positioned to receive light emitting from a corresponding one of the light emitting elements and to direct the light to an edge of the light guide; a housing comprising a support structure and a layer of a heat conducting material disposed on the support structure, where a thermal conductivity of the layer of heat conducting material is greater than a thermal conductivity of a material forming the support structure; and a heat coupling layer arranged between the substrate and the housing, the heat coupling layer being adjacent to the heat conducting material of the housing.

Embodiments of the luminaire assembly may include one or more of the following features and/or features of other aspects. In some implementations, the heat conducting material comprises a metal. For example, the heat conducting material is copper or aluminum.

Among other advantages, embodiments of the luminaire assemblies may include luminaire assemblies that have robust thermo-mechanical properties. In other words, the disclosed luminaire assemblies feature a housing that concurrently provides a heat sink function to extract and dissipate heat generated by the LEEs during operation and a support function to support multiple components of the luminaire assemblies. For example, a disclosed housing—that is formed from a plastic material with an appropriate rigidity to support a luminaire assembly and that is coated with a layer of a material with an appropriately high heat conductivity (e.g., a metal) to readily dissipate heat generated adjacent to the housing—is lighter than a conventional housing, having the same surface area but, being formed solely from the material with the appropriate heat conductivity (e.g., the above-noted metal).

In addition, the luminaire assemblies may be subject to multiple cycles over significant temperature ranges and continue to reliably operate without damage to the assembly. For example, luminaire assemblies may be subject to temperature ranges from below freezing (e.g., −10° C. or lower, which may be experienced during shipment or outdoor applications) to 80° C. or more (e.g., during operation) and maintain alignment of the LEEs to corresponding optical coupling elements despite differential thermal expansion between the optical coupling elements and other components of the assembly.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

Like elements in different figures are identified with the same reference numeral.

DETAILED DESCRIPTION

Figure 1A:
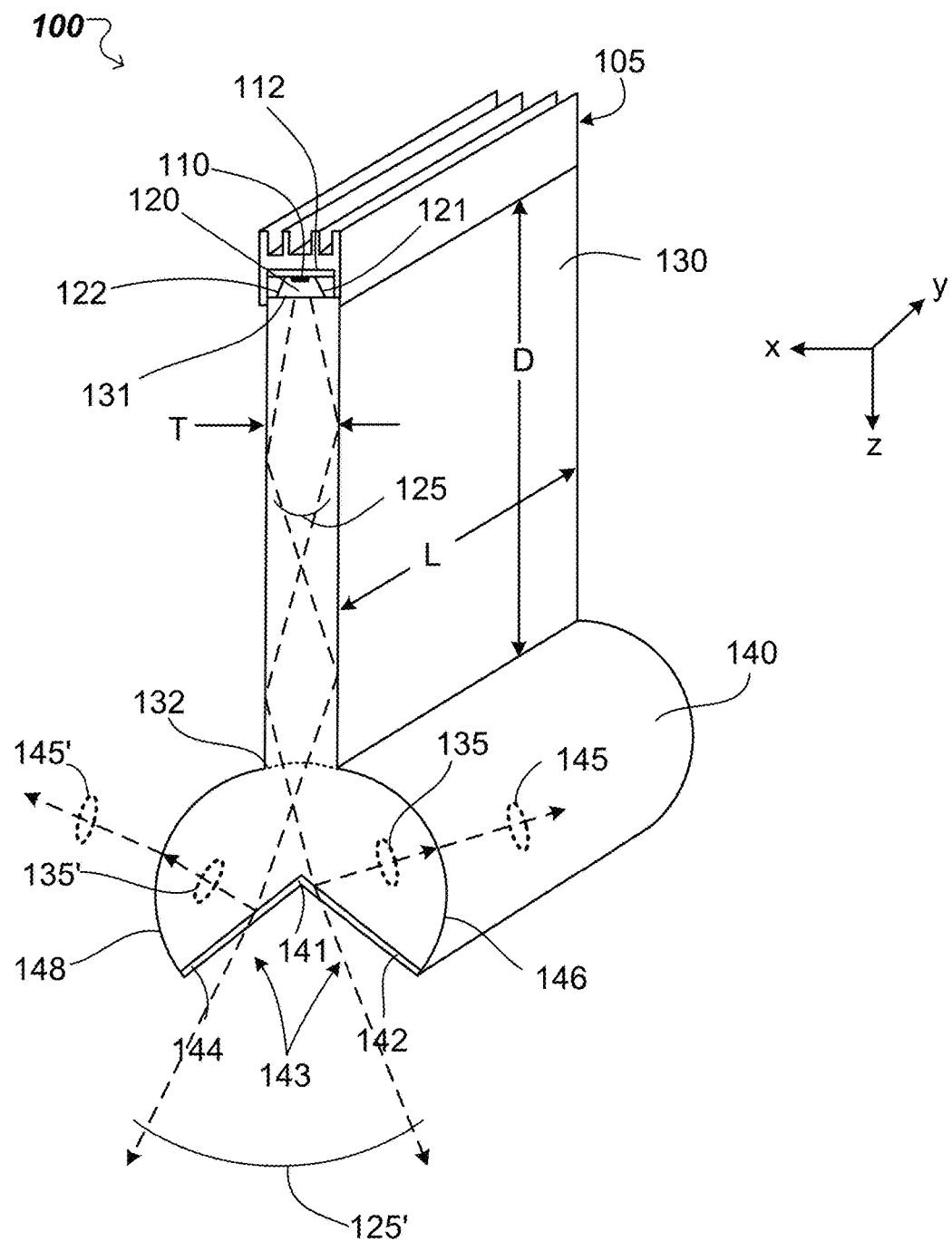
FIGS. 1A-1E show aspects of example luminaire assemblies that feature a light guide.

Referring to FIG. 1A, in which a Cartesian coordinate system is shown for reference, a luminaire assembly 100 includes a substrate 112 having a plurality of LEEs 110 distributed along a first surface of the substrate 112. Note that the luminaire assembly also is referred to as a luminaire module. The substrate 112 with the LEEs 110 is affixed to a housing 105 and is coupled with a first (e.g., upper) edge 131 of a light guide 130. Here, the positive z-direction is referred to as the "forward" direction and the negative z-direction is the "backward" direction. Sections through the luminaire assembly 100 parallel to the x-z plane are referred to as the "cross-section" or "cross-sectional plane" of the luminaire assembly. Also, luminaire assembly 100 extends along the y-direction, so this direction is referred to as the "longitudinal" direction of the luminaire assembly. Implementations of luminaire assemblies can have a plane of symmetry parallel to the y-z plane, be curved or otherwise shaped. This is referred to as the "symmetry plane" of the luminaire assembly.

Multiple LEEs 110 are disposed on the first surface of the substrate 112, although only one of the multiple LEEs 110 is shown in FIG. 1A. For example, the plurality of LEEs 110 can include multiple white LEDs. The LEEs 110 are optically coupled with one or more optical couplers 120 (only one of which is shown in FIG. 1A). An optical extractor 140 is disposed at a second (e.g., lower) edge 132 of the light guide 130.

Substrate 112, light guide 130, and optical extractor 140 extend a length L along the y-direction, so that the luminaire assembly is an elongated luminaire assembly with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 110 on the substrate 112 will generally depend, inter alia, on the length L, where more LEEs are used for longer luminaire assemblies. In some implementations, the plurality of LEEs 110 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire assembly. For example, a relatively high density of LEEs can be used in applications where high illuminance is desired or where low power LEEs are used. In some implementations, the luminaire assembly 100 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. The LEEs can be evenly spaced along the length, L, of the luminaire assembly. The luminaire assembly 100 can include one or multiple types of LEEs, for example one or more subsets of LEEs in which each subset can have different color or color temperature.

In general, the LEEs 110 are devices that emit light in a region or combination of regions of the electromagnetic spectrum that includes the visible region, infrared and/or ultraviolet region, when activated, e.g., by applying a potential difference across it or passing a current through it. The LEEs may have monochromatic, quasi-monochromatic, polychromatic or broadband spectral emission characteristics. Examples of LEEs include semiconductor, organic, or polymer/polymeric light-emitting diodes (LEDs), optically pumped phosphor coated LEDs, optically pumped nanocrystal LEDs or any other similar LEDs. Furthermore, the term light-emitting element is used to define the specific device that emits the radiation, for example a LED die, and can equally be used to define a combination of the specific device that emits the radiation together with a package within which the specific device or devices are placed. Examples of light emitting elements include also lasers and more specifically semiconductor lasers, such as VCSEL (Vertical cavity surface emitting lasers) and edge emitting lasers. Further examples may include superluminescent diodes and other superluminescent devices.

The substrate 112 provides a base layer on which light emitting elements 110 and electrical conductors for delivering electrical power to the light emitting elements can be mounted. The LEEs 110 are secured to substrate 112, e.g., by solder and/or an adhesive. In general, the LEEs are secured to the substrate such that the LEEs move with the substrate as the substrate expands or contracts with thermal changes.

Typically, the substrate 112 is formed, at least in part, from a rigid material. In some embodiments, the substrate 112 includes a printed circuit board (PCB). For example, the substrate 112 can include a board or boards that mechanically support and electrically connect electronic components using conductive tracks, pads and other features etched from copper sheets laminated onto a non-conductive substrate. PCBs can be single sided (e.g., one copper layer), double sided (e.g., two copper layers) or multi-layer. Conductors on different layers can be connected with plated-through holes or vias. In some embodiments, PCBs may contain components—capacitors, resistors or active devices—embedded in the substrate. Examples of PCB's include metal core printed circuit boards (MCPCBs), glass-epoxy laminates (e.g., FR-4) PCBs, ceramic PCBs, flexible circuits boards and a rigid circuit board with flexible interconnects Alternatively, or additionally, in certain embodiments, the substrate 112 includes flexible electronics—also known as flex circuits—which include electronic devices mounted on flexible plastic substrates, such as polyimide, PEEK or transparent conductive polyester film.

Optical couplers 120 may also be secured to the substrate 112. For example, in some embodiments, the optical coupling elements are bonded to the substrate using, e.g., an adhesive, such as an epoxy adhesive.

In general, the LEEs 110 may be coupled to their corresponding optical couplers 120 in a variety of ways. In some embodiments, particularly where the optical couplers 120 are formed from a solid transparent material, the LEEs 110 may be optically coupled to their optical coupling elements using a medium (e.g., a solid, liquid, or gel) with suitable adhesion, cohesion and chemical properties that has a refractive index similar to the refractive index of the material from which the optical element is formed. Examples of such media include silicone (e.g., a single part or dual-part compound, e.g., thermally or UV curable) or epoxy. In certain embodiments, where no medium is used, a gap may exist between the surface of the light emitting element and the optical coupling elements.

As noted above, the optical coupler 120 can include one or more solid pieces of transparent optical material (e.g., a glass material or a transparent organic plastic, such as polycarbonate or acrylic) having surfaces 121 and 122 positioned to reflect light from the LEEs 110 towards the light guide 130. In general, surfaces 121 and 122 are shaped to collect and at least partially collimate light emitted from the LEEs. As such, the optical coupler 120 receives light emitted by the LEEs 110 within an emission angular range and provide light within a second angular range 125 to the receiving end 131 of the light guide 130. The coupler 120 is shaped to transform the emission angular range into the second angular range 125 via total internal reflection, specular reflection or both. Here, the divergence of the second angular range 125 is smaller than the divergence of the emission angular range, such that all light provided by the coupler 120 in the angular range 125 can be injected into the light guide 130 at its receiving end 131. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

In the x-z and/or other cross-sectional planes, surfaces 121 and 122 of the optical coupler 120 can be straight or curved. Examples of curved surfaces include surfaces having a constant radius of curvature, parabolic or hyperbolic shapes. In some implementations, surfaces 121 and 122 are coated with a highly reflective material (e.g., a reflective metal, such as aluminum or silver), to provide a highly reflective optical interface. The cross-sectional profile of optical coupler 120 can be uniform along the length L of luminaire assembly 100. Alternatively, the cross-sectional profile can vary. For example, surfaces 121 and/or 122 can be curved out of the x-z plane.

The exit aperture of the optical coupler 120 adjacent upper edge of light guide 131 is optically coupled to edge 131 to facilitate efficient coupling of light from the optical coupler 120 into light guide 130. For example, the surfaces of a solid coupler and a solid light guide can be attached using a material that substantially matches the refractive index of the material forming the optical coupler 120 or light guide 130 or both (e.g., refractive indices across the interface are different by 2% or less.) The optical coupler 120 can be affixed to light guide 130 using an index matching fluid, grease, or adhesive. In some implementations, optical coupler 120 is fused to light guide 130 or they are integrally formed from a single piece of material (e.g., coupler and light guide may be monolithic and may be made of a solid transparent optical material).

The light guide 130 is formed from a piece of transparent material (e.g., glass material such as BK7, fused silica or quartz glass, or a transparent organic plastic, such as polycarbonate or acrylic) that can be the same or different from the material forming optical couplers 120. Light guide 130 extends over length L in the y-direction, has a uniform thickness T in the x-direction, and a uniform depth D in the z-direction. The dimensions D and T are generally selected based on the desired optical properties of the light guide (e.g., which spatial modes are supported) and/or the direct/ indirect intensity distribution. During operation, light coupled into the light guide 130 from optical coupler 120 (with an angular range 125) reflects off the planar surfaces of the light guide by TIR and spatially mixes within the light guide. The mixing can help achieve illuminance and/or color uniformity, along the y-axis, at the distal portion of the light guide 132 at optical extractor 140. The depth, D, of light guide 130 can be selected to achieve adequate uniformity/ mixing at the exit aperture (i.e., at end 132) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 120 are designed to restrict the angular range of light entering the light guide 130 (e.g., to within +/−40 degrees) so that at least a substantial amount of the light (e.g., 95% or more of the light) is optically coupled into spatial modes in the light guide 130 that undergoes TIR at the planar surfaces. Light guide 130 can have a uniform thickness T, which is the distance separating two planar opposing surfaces of the light guide. Generally, T is sufficiently large so the light guide has an aperture at first (e.g., upper) surface 131 sufficiently large to approximately match (or exceed) the exit aperture of optical coupler 120. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 120 and light guide 130 are formed from solid pieces of transparent optical material, hollow structures are also possible. For example, the optical coupler 120 or the light guide 130 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor.

The LEEs 110 may generate significant heat while operating. This heat is transferred into the structure nearby the LEEs including the substrate 112 and optical couplers 120 causing thermal expansion of those components. Depending on the materials of which these components are formed, relative expansion of these components may differ over at least a part of the temperature range experienced by the components. Accordingly, in some implementations, luminaire assemblies are constructed in a manner that thermal expansion of various components of the assembly does not result in damage to the luminaire assembly. For example, assemblies may be constructed so that differential thermal expansion of various components may be accommodated without misalignment of the light emitting elements with respect to their corresponding optical coupling element. Such implementations may be particularly beneficial in luminaire assemblies that extend significantly in one (or more) dimensions, where thermal expansion in the extended direction may be significant. Moreover, in addition to accommodating differential thermal expansion between different components, the construction of luminaire assemblies may be sufficiently robust to withstand mechanical shock, e.g., such as standard drop tests or impacts associated with shipping and installing light fixtures.

Figure 1B:
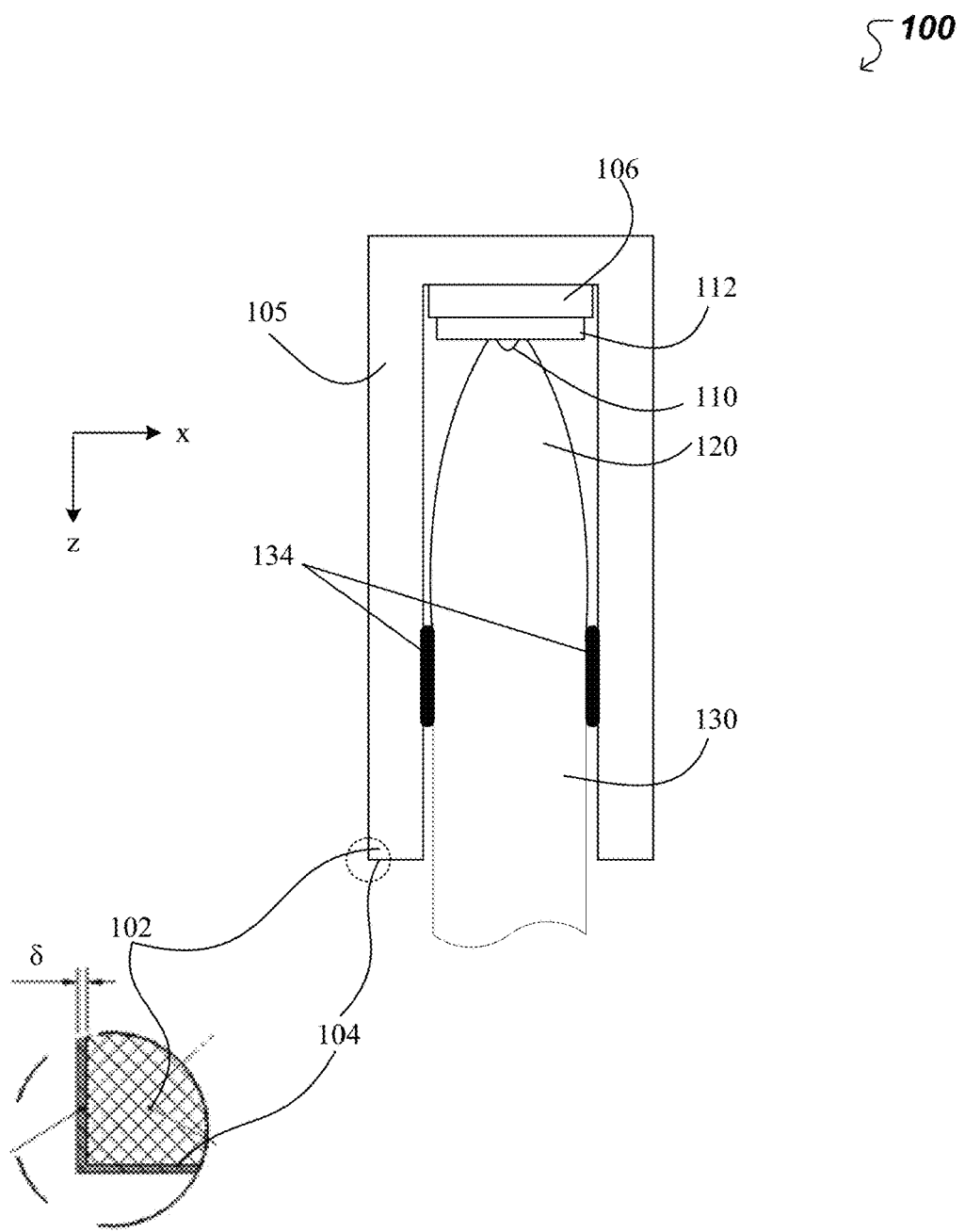

Referring now to FIG. 1B, the housing 105 is used to provide, on one hand, a rigid base for securing other components of luminaire assembly 100 together, and on the other hand, a heat sink for extracting heat emitted by the plurality of LEEs 110. In this example, the housing 105 has a U-shaped profile in the x-z cross-section. In other examples, the housing 105 can have an L-shaped profile in the x-z cross-section.

For instance, both light guide 130 and substrate 112 can be secured to housing 105. The housing 105 may also include connectors and other mounting components. For example, housing 105 can include attachments for connecting to one or more cables for suspending the luminaire assembly 100 from a ceiling, or attachments for connecting the luminaire assembly to a frame (not shown in FIGS. 1A-1B). As another example, the housing 105 can include a support for attaching secondary reflectors to the luminaire assembly, as shown below in connection with FIGS. 2B, 4B and 5C.

Moreover, the substrate 112 can be thermally coupled to the housing 105 via a heat coupling layer 106, which facilitates transfer of heat from the substrate to the housing. Accordingly, in some implementations, the heat coupling layer 106 is formed from a material having a relatively high thermal conductivity. In some implementations, the heat coupling layer 106 is formed from a shock absorbent material (e.g., a foam), improving resistance of the luminaire assembly 100 to vibration or mechanical shock. As such, the heat coupling layer 106 can be formed from a thermal pad, such as a thermal pad formed from a thermally conductive silicone, for example. As another example, thermally conductive adhesive transfer tapes, such as those commercially-available from 3M Company (Maplewood, Minn.) may be used.

In the example illustrated in FIG. 1B, the light guide 130 is secured to the housing 105 by fasteners 134 (e.g., threaded fasteners, such as screws or bolts, etc.) The fasteners 134 can engage the light guide 130 via a plurality of holes in the housing 105 and/or in the light guide. Some of the holes are shaped to provide sliding fits for corresponding fasteners. Such holes can be formed as slits oriented along the y-direction to allow sliding of the light guide 130 along a portion of its length relative to the housing 105 during thermal expansion/contraction. Other tighter fitting hole/fastener combinations are used to accurately register the light guide 130 and the housing 105 in the luminaire assembly 100. Compared to locating a tight fitting hole/fastener combinations proximate an end of the light guide 130 (e.g., near y≈0 or y≈L), locating it halfway along the length of the light guide 130 (e.g., near y=L/2) provides half the absolute length change during thermal expansion on either side of the tight fit. Luminaire assemblies with one light guide can use one tight fitting hole/fastener combination with the remaining hole/fastener combinations configured to allow sliding in y-direction.

In addition to providing mechanical support, the housing 105 may also function as a heat sink for the luminaire assembly 100. For example, the housing 105 may function as a passive heat exchanger that cools the luminaire assembly 100 by dissipating heat into the surrounding medium. Accordingly, in some implementations, the housing 105 includes a material that has a high thermal conductivity to facilitate heat dissipation. Such materials include, for example, certain metals, including (but not limited to) aluminum and aluminum alloys (e.g., alloys 1050A, 6061, or 6063) and copper. In some implementations, composite materials can be used. Examples are copper-tungsten pseudoalloy, AlSiC (silicon carbide in aluminum matrix), Dymalloy (diamond in copper-silver alloy matrix), and E-Material (beryllium oxide in beryllium matrix). Some composite materials may be sintered. Such housing 105 may be formed from a single piece of high thermal conductivity material, for instance, from a single piece of machined or extruded metal/metal alloy or from a single piece of cast matrix.

In other implementations, e.g. as illustrated in FIG. 1B, the housing 105 is composed of two or more different component materials. Here, the housing 105 is formed from a base material 102, providing mechanical strength (e.g., plastic that has been machined, molded, or extruded), coated with a layer of material 104 having a high thermal conductivity to facilitate heat dissipation. Examples of such materials include those discussed above. The layer of material having high thermal conductivity is located proximate to substrate 112, e.g., in contact with the heat coupling layer 106, to facilitate heat dissipation from the LEEs 110.

Figure 1C:
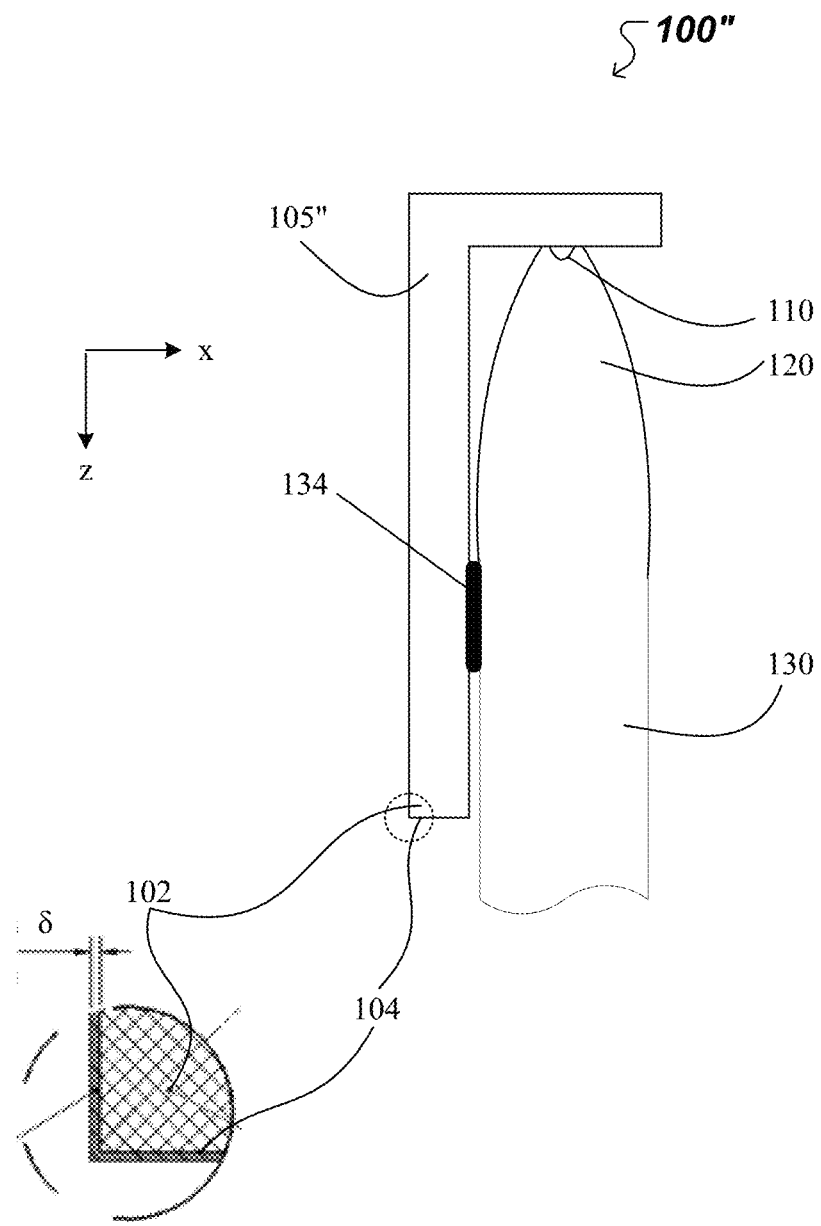

FIG. 1C illustrates a side view of a portion of another example luminaire assembly 100" similar to the luminaire assembly 100. The luminaire assembly 100" includes a housing 105" that is configured to provide a rigid base for securing other components of the luminaire assembly, a heat sink for extracting heat emitted by the LEEs 110 and a substrate with traces for providing electrical power to the LEEs. The housing 105" has an L-shaped profile in the x-z cross-section.

In this example, a light guide 130 is provided together with optical couplers 120 which are secured to housing 105". The housing 105" may also include connectors and other mounting components. For example, housing 105" can include attachments for connecting to one or more cables for suspending the luminaire assembly 100" from a ceiling, or attachments for connecting the luminaire assembly to a frame (not shown in FIG. 1C). As another example, the housing 105" can include a support for attaching secondary reflectors to the luminaire assembly, as shown below in connection with FIGS. 2B, 4B and 5C.

The light guide 130 is secured to the housing 105" by fasteners 134 (e.g., threaded fasteners, such as screws or bolts, etc.) The fasteners 134 can engage the light guide 130 via a plurality of holes in the housing 105" and/or in the light guide 130 in manners as described herein.

In this example, the housing 105" also functions as a heat sink for the luminaire assembly 100". The housing 105" provides a passive heat exchanger that cools the luminaire assembly 100" by dissipating heat into the surrounding medium. Accordingly, in some implementations, the housing 105" includes a material that has a high thermal conductivity to facilitate heat dissipation. Such materials include, for example, certain metals, including (but not limited to) aluminum and aluminum alloys (e.g., alloys 1050A, 6061, or 6063) and copper. In some implementations, composite materials can be used. Examples are copper-tungsten pseudoalloy, AlSiC (silicon carbide in aluminum matrix), Dymalloy (diamond in copper-silver alloy matrix), and E-Material (beryllium oxide in beryllium matrix). Some composite materials may be sintered.

The housing 105" is composed of two or more different component materials. Here, the core of the housing 105" is formed from a dielectric base material 102, providing mechanical strength (e.g., plastic that has been machined, molded, or extruded), coated with a layer of material 104 having a high thermal conductivity to facilitate heat dissipation. Examples of such materials are described herein. The provision of traces directly by the housing makes the housing act as a substrate for electrically interconnecting the LEEs 110 and at the same time provide high thermal conductivity to facilitate heat dissipation from the LEEs. The housing 105" may be formed as described herein, bent from a piece of MCPCB or otherwise formed. Traces may be formed before or after bending.

Referring again to FIG. 1A, the optical extractor 140 is also composed of a solid piece of transparent optical material (e.g., a glass material or a transparent organic plastic, such as polycarbonate or acrylic) that can be the same as or different from the material forming light guide 130. In the example implementation shown in FIG. 1A, the optical extractor 140 includes redirecting (e.g., flat) surfaces 142 and 144 and curved surfaces 146 and 148. The flat surfaces 142 and 144 represent first and second portions of a redirecting surface 143, while the curved surfaces 146 and 148 represent first and second output surfaces of the luminaire assembly 100.

Surfaces 142 and 144 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 142 and 144 provide a highly reflective optical interface for light having the angular range 125 entering an input end of the optical extractor from the output end 132 of the light guide 130. As another example, the surfaces 142 and 144 include portions that are transparent to the light entering at the input end of the optical extractor 140. Here, these portions can be uncoated regions (e.g., partially silvered regions) or discontinuities (e.g., slots, slits, apertures) of the surfaces 142 and 144. As such, some light is transmitted in the forward direction (along the z-axis) through surfaces 142 and 144 of the optical extractor 140 in an output angular range 125'. In some cases, the light transmitted in the output angular range is refracted. In this way, the redirecting surface 143 acts as a beam splitter rather than a mirror, and transmits in the output angular range 125' a desired portion of incident light, while reflecting the remaining light in angular ranges 135 and 135'.

In the x-z cross-sectional plane, the lines corresponding to surfaces 142 and 144 have the same length and form an apex or vertex 141, e.g. a v-shape that meets at the apex 141. In general, an included angle (e.g., the smallest included angle between the surfaces 144 and 142) of the redirecting surfaces 142, 144 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 1A, the output surfaces 146, 148 of the optical extractor 140 are curved with a constant radius of curvature that is the same for both. In an aspect, the output surfaces 146, 148 may have optical power (e.g., may focus or defocus light.) Accordingly, luminaire assembly 100 has a plane of symmetry intersecting apex 141 parallel to the y-z plane.

The surface of optical extractor 140 adjacent to the lower edge 132 of light guide 130 is optically coupled to edge 132. For example, optical extractor 140 can be affixed to light guide 130 using an index matching fluid, grease, or adhesive. In some implementations, optical extractor 140 is fused to light guide 130 or they are integrally formed from a single piece of material.

Figure 1D:
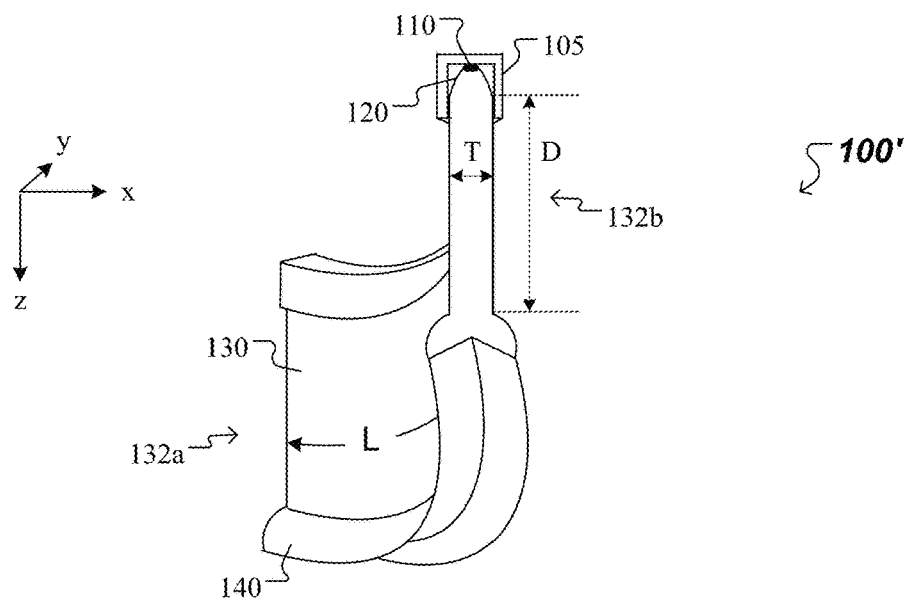

Other open and closed shapes of the luminaire assembly 100 are possible. FIG. 1D shows an example of a luminaire assembly 100' for which the light guide 130 has two opposing side surfaces 132a, 132b that form a cylinder shell of thickness T. Here, the x-y cross-section of the cylinder shell formed by the opposing side surfaces 132a, 132b is oval. In other cases, the x-y cross-section of the cylinder shell can be an arc of a circle or can have other shapes. For T=0.05D, 0.1D or 0.2D, for instance, light from multiple, point-like LEEs 110—distributed along a curved path of length L—that is edge-coupled into the light guide 130 at the receiving end can efficiently mix and become uniform (quasi-continuous) along such an elliptical path by the time it propagates to the opposing end. Note that a housing 105 of the luminaire assembly 100' is shaped in conformance with the shape of the cylindrical shell-shaped light guide 130.

Referring again to FIG. 1A, light exiting light guide 130 through end 132, during operation, impinges on the reflective interfaces at portions of the redirecting surface 142 and 144 and is reflected outwardly towards output surfaces 146 and 148, respectively, away from the symmetry plane of the luminaire assembly. The first portion of the redirecting surface 142 provides light having an angular distribution 135 towards the output surface 146, the second portion of the redirecting surface 144 provides light having an angular distribution 135' towards the output surface 146. The light exits optical extractor through output surfaces 146 and 148. In general, the output surfaces 146 and 148 have optical power, to redirect the light exiting the optical extractor 140 in angular ranges 145 and 145', respectively. For example, optical extractor 140 may be configured to emit light upwards (i.e., towards the plane intersecting the LEEs and parallel to the x-y plane), downwards (i.e., away from that plane) or both upwards and downwards. In general, the direction of light exiting the luminaire assembly through surfaces 146 and 148 depends on the divergence of the light exiting light guide 130 and the orientation of surfaces 142 and 144.

Surfaces 142 and 144 may be oriented so that little or no light from light guide 130 is output by optical extractor 140 in certain directions. In implementations where the luminaire assembly 100 is attached to a ceiling of a room (e.g., the forward direction is towards the floor) such configurations can help avoid glare and an appearance of non-uniform illuminance.

In general, the light intensity distribution provided by luminaire assembly 100 reflects the symmetry of the luminaire assembly's structure about the y-z plane. For example, light output in angular range 145' may correspond to a first output lobe of a far-field light intensity distribution, light output in angular range 145 corresponds to a second output lobe of the far-field light intensity distribution and light output (leaked) in angular range 125' corresponds to a third output lobe of the far-field light intensity distribution. In general, an intensity profile of luminaire assembly 100 will depend on the configuration of the optical coupler 120, the light guide 130 and the optical extractor 140. For instance, the interplay between the shape of the optical coupler 120, the shape of the redirecting surface 143 of the optical extractor 140 and the shapes of the output surfaces 146, 148 of the optical extractor 140 can be used to control the angular width and prevalent direction (orientation) of the first and second output lobes in the far-field light intensity profile. Additionally, a ratio of an amount of light in the combination of first and second output lobes and light in the third output lobe is controlled by reflectivity and transmissivity of the redirecting surfaces 142 and 144. For example, for a reflectivity of 90% and transmissivity of 10% of the redirecting surfaces 142, 144, 45% of light can be output in the output angular range 145' corresponding to the first output lobe, 45% light can be output in the output angular range 145 corresponding to the second output lobe, and 10% of light can be output in the output angular range 125' corresponding to the third output lobe.

In some implementations, the orientation of the first and second output lobes can be adjusted based on the included angle of the v-shaped groove 141 formed by the portions of the redirecting surface 142 and 144. For example, a first included angle results in a far-field light intensity distribution with first and second output lobes located at relatively smaller angles compared to first and second output lobes of the far-field light intensity distribution that results for a second included angle larger than the first angle. In this manner, light can be extracted from the luminaire assembly 100 in a more forward direction for the smaller of two included angles formed by the portions 142, 144 of the redirecting surface 143.

Furthermore, while surfaces 142 and 144 are depicted as planar surfaces, other shapes are also possible. For example, these surfaces can be curved or faceted. Curved redirecting surfaces 142 and 144 can be used to narrow or widen the first and second output lobes. Depending of the divergence of the angular range 125 of the light that is received at the input end of the optical extractor, concave reflective surfaces 142, 144 can narrow the first and second lobes output by the optical extractor 140, while convex reflective surfaces 142, 144 can widen the first and second lobes output by the optical extractor 140. As such, suitably configured redirecting surfaces 142, 144 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire assembly 100 can be designed to output light into different output angular ranges 145, 145' from those shown in FIG. 1A. For example, in general, the first and second output lobes can have a width of up to about 90° (e.g., 80° or less, 70° or less, 60° or less, 50° or less, 40° or less, 30° or less, 20° or less). Moreover, the first and second output lobes are oriented at approx. −130° and approximately +130°. In general, first and second output lobes can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

Figure 1E:
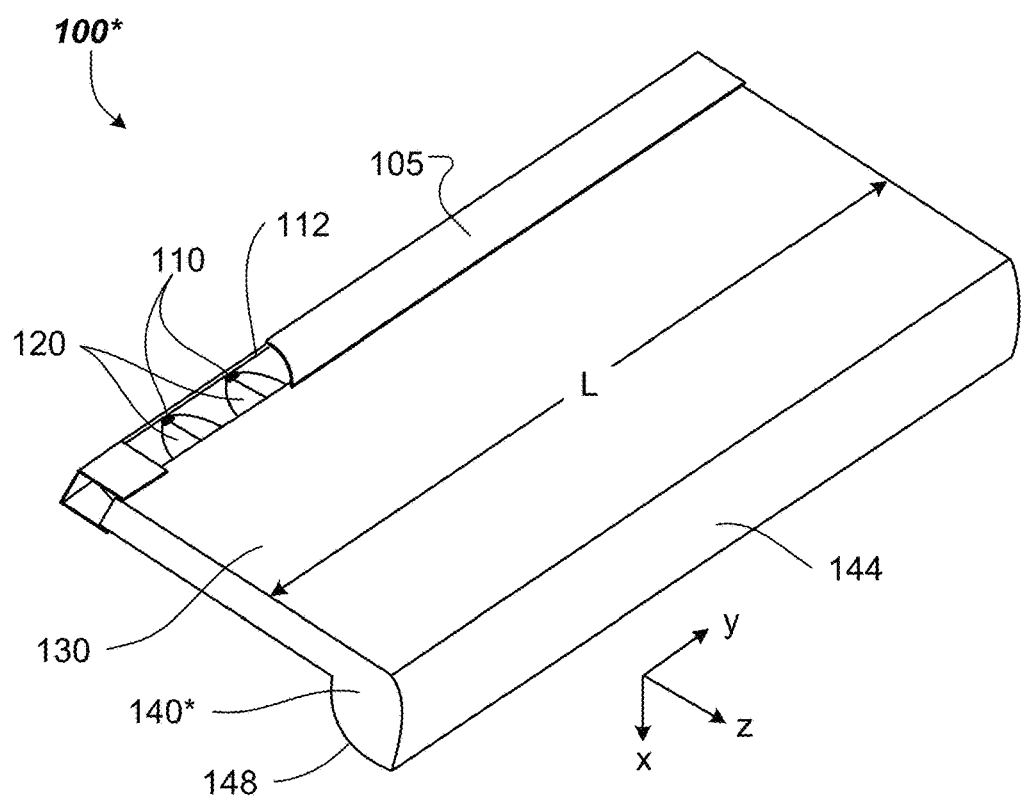

In the example implementations described in connection with FIG. 1A, the luminaire assembly 100 is configured to output light into output angular ranges 145 and 145'. In other implementations (e.g., see FIG. 1E), a light guide-based luminaire assembly is modified to output light into a single output angular range 145'. Such light guide-based luminaire assembly configured to output light on a single side of the light guide is referred to as a single-sided luminaire assembly and is denoted 100*. FIG. 1E shows an example of a single-sided luminaire assembly 100* that is elongated along the y-axis. Also like the luminaire assembly 100, the single-sided luminaire assembly 100* includes a substrate 112 and LEEs 110 disposed on a surface of the substrate along the y-axis to emit light in a first angular range. As described above, the substrate 112 is affixed to a housing 105. The single-sided luminaire assembly 100* further includes optical couplers 120 arranged and configured to redirect the light emitted by the LEEs 110 in the first angular range into a second angular range 125 that has a divergence smaller than the divergence of the first angular range at least in the x-z cross-section. Also, the single-sided luminaire assembly 100* includes a light guide 130 to guide the light redirected by the optical couplers 120 in the second angular range 125 from a first end of the light guide to a second end of the light guide. Additionally, the single-sided luminaire assembly 100* includes a single-sided extractor (denoted 140*) to receive the light guided by the light guide 130. The single-sided extractor 140* includes a redirecting surface 144 to redirect the light received from the light guide 130 into a third angular range 135', like described for luminaire assembly 100 with reference to FIG. 1A, and an output surface 148 to output the light redirected by the redirecting surface 144 in the third angular range 135' into a fourth angular range 145'.

A light intensity profile of the single-sided luminaire assembly 100* includes a single output lobe. The single output lobe corresponds to light output by the single-sided luminaire assembly 100* in the fourth angular range 145'.

Referring again to FIG. 1A, a luminaire assembly can include other features useful for tailoring the intensity profile. For example, in some implementations, luminaire assemblies can include an optically diffuse material that can diffuse light in a controlled manner to aid homogenizing the luminaire assembly's intensity profile. For example, surfaces 142 and 144 can be roughened or a diffusely reflecting material, rather than a specular reflective material, can be coated on these surfaces. Accordingly, the optical interfaces at surfaces 142 and 144 can diffusely reflect light, scattering light into broader lobes than would be provided by similar structures utilizing specular reflection at these interfaces. In some implementations these surfaces can include structure that facilitates various intensity distributions. For example, surfaces 142 and 144 can each have multiple planar facets at differing orientations. Accordingly, each facet will reflect light into different directions. In some implementations, surfaces 142 and 144 can have structure thereon (e.g., structural features that scatter or diffract light).

Surfaces 146 and 148 need not be surfaces having a constant radius of curvature. For example, surfaces 146 and 148 can include portions having differing curvature and/or can have structure thereon (e.g., structural features that scatter or diffract light). In certain implementations, a light scattering material can be disposed on surfaces 146 and 148 of optical extractor 140.

In some implementations, optical extractor 140 is structured so that a negligible amount (e.g., less than 1%) of the light propagating within at least one plane (e.g., the x-z cross-sectional plane) that is reflected by surface 142 or 144 experiences TIR at light-exit surface 146 or 148. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on surface of the circular structure and has an angle of incidence less than the critical angle and will exit circular structure without experiencing TIR. Light rays propagating within spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than R/(1+n2)(-½), which is smaller than R/n, will be subject to small Fresnel reflection at the surface of radius R when exiting the circular structure. This condition may be referred to as Brewster geometry. Implementations may be configured accordingly.

In some implementations, all or part of surfaces 142 and 144 may be located within a notional Weierstrass surface defined by surfaces 146 and 148. For example, the portions of surfaces 142 and 144 that receive light exiting light guide 130 through end 132 can reside within this surface so that light within the x-z plane reflected from surfaces 142 and 144 exits through surfaces 146 and 148, respectively, without experiencing TIR.

Moreover, the emission spectrum of the luminaire assembly 100 corresponds to the emission spectrum of the LEEs 110. However, in some implementations, a wavelength-conversion material may be positioned in the luminaire assembly, for example remote from the LEEs, so that the wavelength spectrum of the luminaire assembly is dependent both on the emission spectrum of the LEEs and the composition of the wavelength-conversion material. In general, a wavelength-conversion material can be placed in a variety of different locations in luminaire assembly 100. For example, a wavelength-conversion material may be disposed proximate the LEEs 110, adjacent surfaces 142 and 144 of optical extractor 140, on the exit surfaces 146 and 148 of optical extractor 140, and/or at other locations.

The layer of wavelength-conversion material (e.g., phosphor) may be attached to light guide 130 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between R/n and R*(1+n2)(-½), where R is the radius of curvature of the light-exit surfaces (146 and 148 in FIG. 1A) of the extractor 140 and n is the index of refraction of the portion of the extractor that is opposite of the wavelength-conversion material as viewed from the reflective surfaces (142 and 144 in FIG. 1A). The support structure may be a transparent self-supporting structure. The wavelength-conversion material diffuses light as it converts the wavelengths, provides mixing of the light and can help uniformly illuminate a surface of the ambient environment.

Figure 2A:
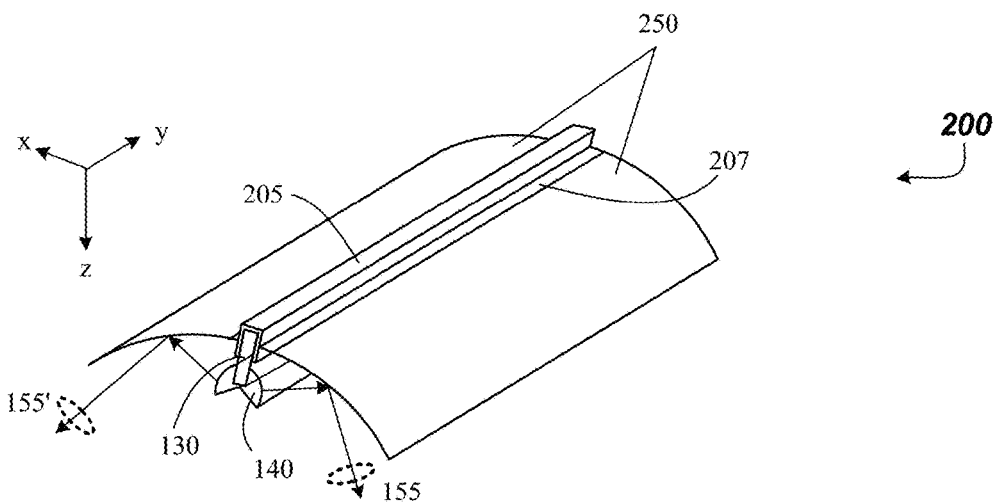
FIGS. 2A-2B show aspects of an example of a luminaire system that features a luminaire assembly like the ones shown in FIGS. 1A-1D and secondary reflectors.
Figure 2B:
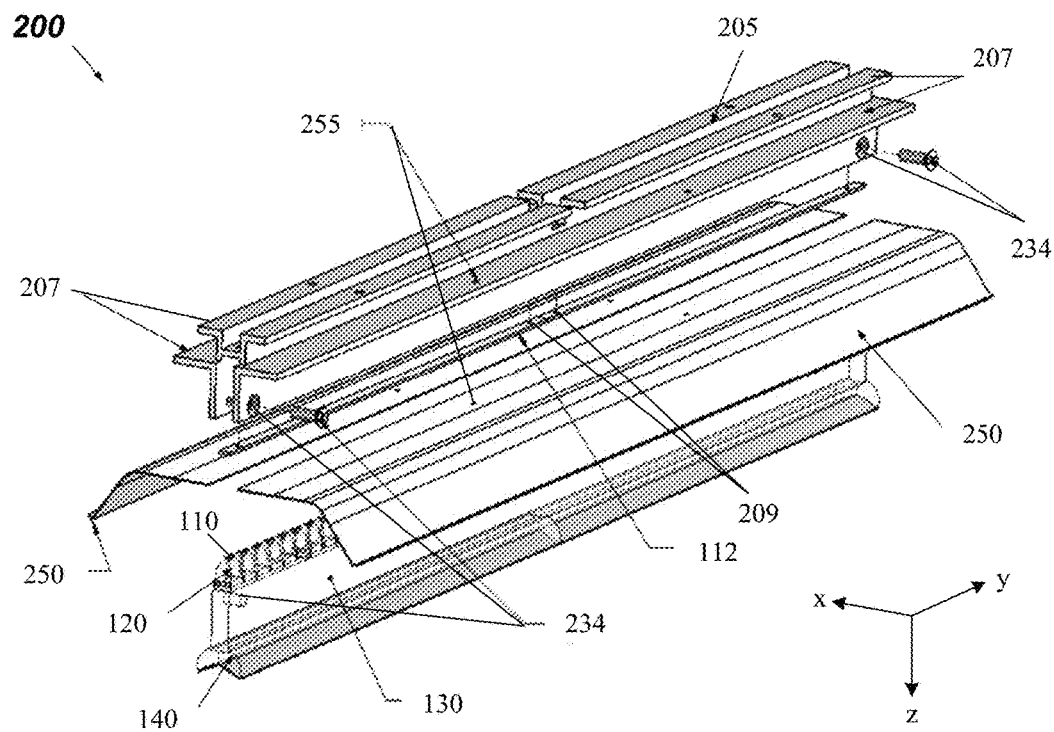

In some implementations, a luminaire system can include the luminaire assembly 100/100* in combination in with one or more secondary reflectors to further tailor the intensity profile of the luminaire assembly. FIG. 2A is a perspective view of such a luminaire system 200 and FIG. 2B is an exploded view of the same. For example, the luminaire system 200 includes the luminaire assembly 100 and secondary reflectors 250 that attach to a housing 205 of the luminaire assembly 100. The luminaire assembly 100 includes a substrate 112, LEEs 110, optical couplers 120, light guide 130 and optical extractor 140. Light emitted by the LEEs 110 is coupled via optical couplers 120 into light guide 130 as described previously. Optical extractor 140 outputs at least some of the guided light into output angular ranges 145, 145'. The secondary reflectors 250 extend outward into the path of the light exiting optical extractor 140 in the output angular ranges 145 and 145'. The secondary reflectors 250 are shaped to redirect the light output by the optical extractor 140 towards to a target surface, in angular ranges 155, 155'. In some implementations, surfaces of the secondary reflectors 250 are configured to be specular reflecting surfaces or diffusely reflecting surfaces. Furthermore, the shape of the surfaces (in this instance, flat over a first portion and concave over a second portion) provides an additional degree of freedom for a designer to tailor the light distribution profile from luminaire system 200.

In other implementations, the secondary reflectors 250 can be partially transmissive. For example, the secondary reflectors 250 can include apertures that allow some of the light output by optical extractor 140 to pass through the secondary reflectors and reflect from a ceiling, for instance. Alternatively, or additionally, secondary reflectors 250 can be formed from a reflective material that only partially reflects light. For example, secondary reflectors 250 can be formed from a transparent material and a partially reflective coating (e.g., a partially silvered mirror). In this manner, luminaire system 200 can provide both direct illumination (i.e., light that propagates directly from the luminaire system to the target surface) and indirect illumination (i.e., light that propagates to the target surface after being redirected by the ceiling, for instance).

Referring to FIG. 2B, the housing 205 includes a U-shaped portion arranged with its opening toward the positive z-axis, and two support portions 207 formed on outside surfaces of the arms of the U-shaped portion of the housing 205. Each of the two support portions 207 of the housing 205 is formed from a pair of flanges. Pin-hole combinations 255 on the pair of flanges of each support portion 207 are configured to fasten a respective secondary reflector 250 by attaching an end of the secondary reflector to one or more of the flanges. The substrate 112 is coupled with the inside surface of the base of the U-shaped portion of the housing 205 using pin-hole combinations 209. Moreover, the light guide 130 is attached to inside surfaces of the arms of the U-shaped portion of the housing 205 using fastener-hole combinations 234.

Further, the housing 205 may also function as a heat sink for the luminaire system 200. For example, the housing 205 may function as a passive heat exchanger that cools the luminaire system 200 by dissipating heat into the surrounding medium. As such, in some implementations, the housing 205 is formed from a single material/alloy that has a high thermal conductivity to facilitate heat dissipation. In other implementations, the housing 205 is formed from a base material, providing mechanical strength (e.g., plastic that has been machined, molded, or extruded), coated with a layer of material (e.g., a metal or metal alloy) having a high thermal conductivity to facilitate heat dissipation.

In the examples described above in connection with FIGS. 1A, 1C-1D and 2A-2B the luminaire assemblies 100/100'/100* include a light guide 130 to guide (translate) light from the exit aperture of the optical couplers 120 to the input end of the optical extractor 140. "Hollow" luminaire assemblies are luminaire assemblies that include optical couplers but no light guide. Hollow luminaire assemblies and luminaire systems that include hollow luminaire assemblies are described below.

Figure 3:
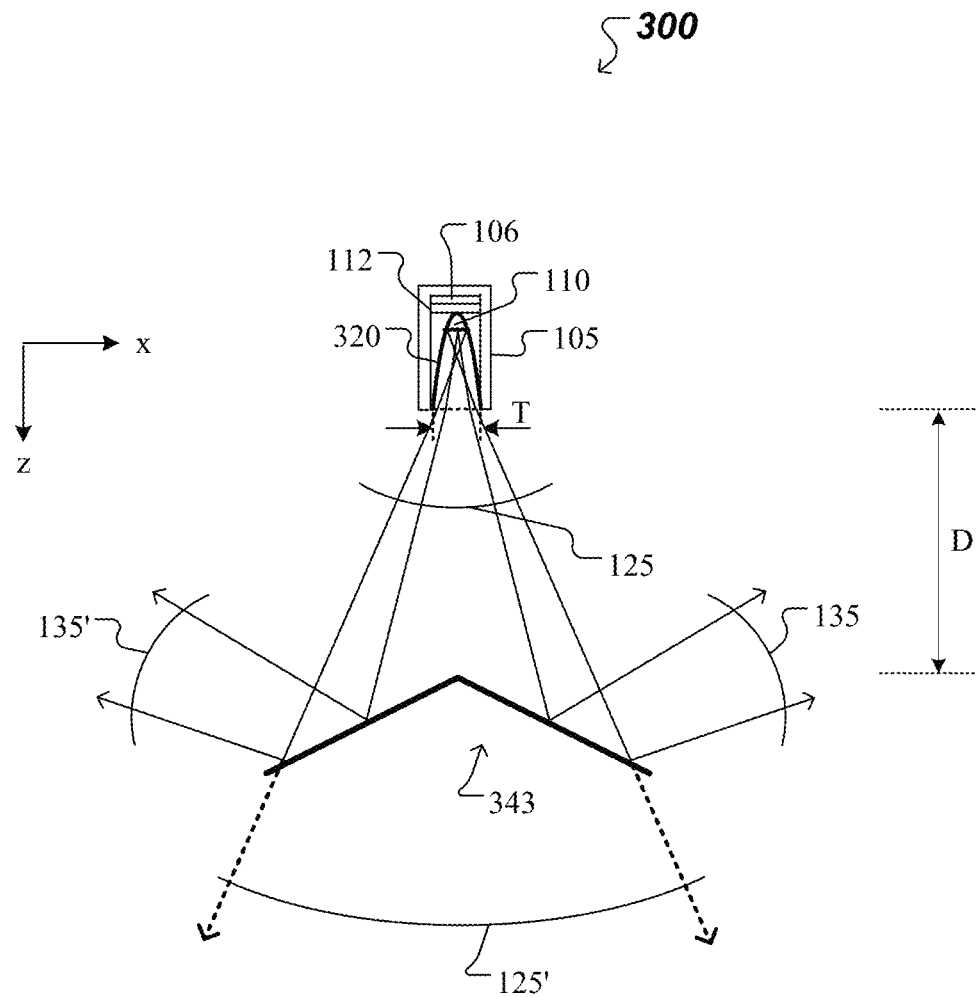
FIG. 3 shows an example of a luminaire assembly that does not feature a light guide.

FIG. 3 illustrates an example of such hollow luminaire module 300 that includes LEEs 110 (like the LEEs of luminaire assemblies 100/100'/100*), one or more corresponding optical couplers 320 (e.g., hollow optical couplers, as opposed to the solid optical couplers of luminaire assemblies 100/100'/100*) and an optical extractor (simplified relative to the optical extractor 140/140* of the luminaire assemblies 100/100'/100*) that uses only a redirecting surface 343 to extract—to the ambient environment—the light provided by the optical couplers 320. The hollow luminaire assembly 300 is elongated along the y-axis like the luminaire assemblies 100/100'/100*. Also like the luminaire assemblies 100/100'/100*, the hollow luminaire assembly 300 includes a substrate 112 (having a normal along the z-axis) such that the LEEs 110 are disposed on a surface of the substrate 112 along the y-axis to emit light in a first angular range along the z-axis.

Also in analogy to the luminaire assemblies 100/100'/100*, the hollow luminaire assembly 300 includes a housing 105, as described above in connection with FIG. 1B, used to provide, on one hand, a rigid base for securing other components of hollow luminaire assembly 300 together, and on the other hand, a heat sink for extracting heat emitted by the plurality of LEEs 110. In this example, the housing 105 has a U-shaped profile in the x-z cross-section. In other examples, the housing 105 can have an L-shaped profile in the x-z cross-section.

For example, the substrate 112 is thermally coupled to an inside surface of the base of the U-shaped housing 105 via a heat coupling layer 106, which facilitates transfer of heat from the substrate to the housing. Moreover in this case, the optical couplers 320 can be attached only to the substrate 112, only to inside surfaces of the arms of the U-shaped housing 105, or to both the substrate 112 and the housing.

Further, the housing 105 may also function as a heat sink for the luminaire assembly 100. For example, the housing 105 may function as a passive heat exchanger that cools the hollow luminaire assembly 300 by dissipating heat into the surrounding medium. As such, the housing 105 is formed from a single material/alloy that has a high thermal conductivity to facilitate heat dissipation, in some implementations. In other implementations, the housing 105 is formed from a base material, providing mechanical strength (e.g., plastic that has been machined, molded, or extruded), coated with a layer of material (e.g., a metal or metal alloy) having a high thermal conductivity to facilitate heat dissipation, as described above in connection with FIG. 1B.

Furthermore, the optical couplers 320 the hollow luminaire assembly 300 are arranged and configured to redirect the light emitted by the LEEs 110 in the first angular range into a second angular range 125 that has a divergence smaller than the divergence of the first angular range at least in the x-z cross-section. Here, the redirecting surface 343 is spaced apart from an exit aperture of the optical couplers 320 by a distance D and includes two reflecting surfaces arranged to form a v-profile with an apex pointing toward the optical couplers 320. The distance D is selected based on a divergence of the second angular range 125 and of a transverse dimension (along the x-axis) of the redirecting surface 343, such that all light provided by the optical couplers 320 in the second angular range 125 impinges on the redirecting surface 343. In this manner, a portion of the redirecting surface 343 redirects some of the light received from the optical couplers 320 into a third angular range 135' and another portion of the redirecting surface 343 redirects the remaining light received from the optical couplers 320 into a fourth angular range 135.

In some cases, the redirecting surface 343 is semitransparent. In this manner, a fraction of the light received from the optical couplers 320 in angular range 125 is transmitted (leaks) through the redirecting surface 343 in a fifth angular range 125'. A prevalent propagation direction for the fifth angular range 125' is in the forward direction (along the z-axis.)

A light intensity profile of the hollow luminaire assembly 300 can be represented similar to the one of the luminaire assemblies 100/100'/100* as first and second output lobes, and optionally as an additional third output lobe. By comparison, the first output lobe corresponds to light output by the hollow luminaire assembly 300 in the third angular range 135', the second output lobe corresponds to light output by the hollow luminaire assembly 300 in the fourth angular range 135, and the third output lobe corresponds to light output by the hollow luminaire assembly 300 in the fifth angular range 125'.

Figure 4A:
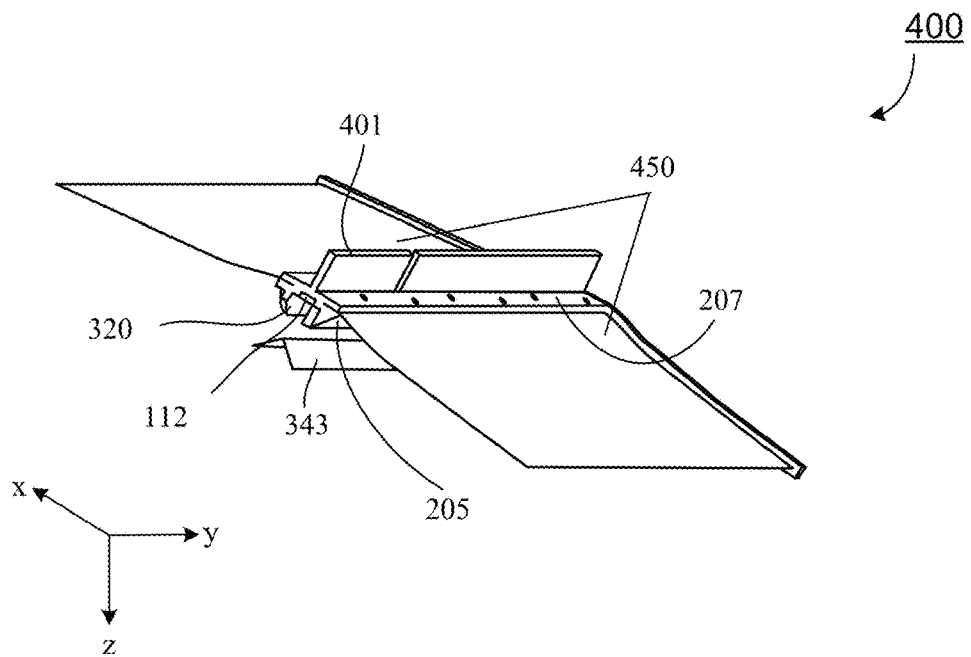
FIGS. 4A-4B show aspects of an example of a luminaire system that features a luminaire assembly like the one shown in FIG. 3 and secondary reflectors.
Figure 4B:
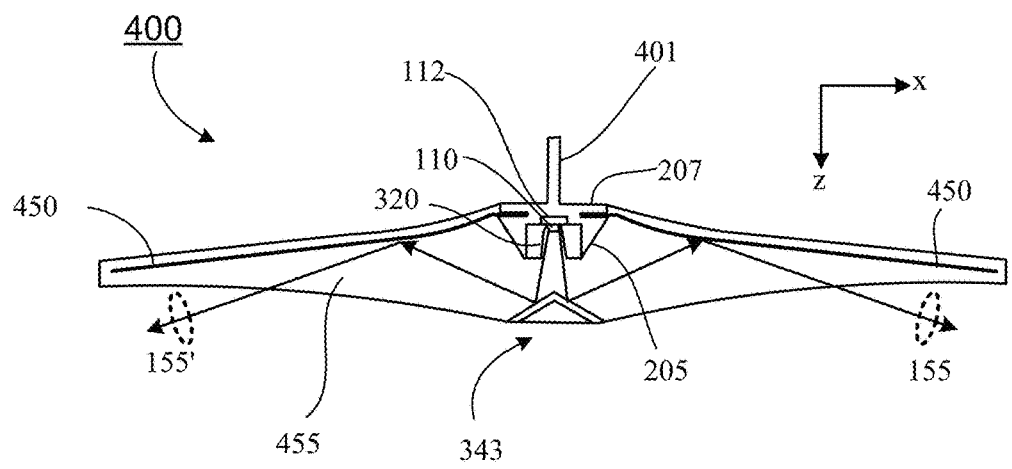

In some implementations, a luminaire system can include the hollow luminaire assembly 300 in combination in with one or more secondary reflectors to further tailor the intensity profile of the hollow luminaire assembly. FIG. 4A is a perspective view of such a luminaire system 400 and FIG. 4B is side view of the same.

For example, the luminaire system 400 includes the hollow luminaire assembly 300 and secondary reflectors 450 that attach to a housing 205 of the luminaire assembly. The hollow luminaire assembly 300 includes a substrate 112, LEEs 110, optical couplers 320 and redirecting surface 343. Light emitted by the LEEs 110 is provided via optical couplers 320 to the redirecting surface 343, as described previously. The redirecting surface 343 outputs at least some of the provided light into output angular ranges 135, 135'.

Mounting frame 455 is configured to secure and position the redirecting surface 343 at a predefined distance, D, from the optical couplers 320.

The secondary reflectors 450 extend outward into the path of the light redirected by the redirecting surface 343 in the output angular ranges 135 and 135'. The secondary reflectors 450 are shaped to redirect the light redirected by the redirecting surface 343 towards to a target surface, in angular ranges 155, 155'. In some implementations, surfaces of the secondary reflectors 450 are configured to be specular reflecting surfaces or diffusely reflecting surfaces. Furthermore, the shape of the surfaces (in this instance, convex over a first portion and flat over a second portion) provides an additional degree of freedom for a designer to tailor the light distribution profile from luminaire system 400.

In other implementations, the secondary reflectors 450 can be partially transmissive. For example, the secondary reflectors 450 can include apertures that allow some of the light redirected by redirecting surface 343 to pass through the secondary reflectors and reflect from a ceiling, for instance. Alternatively, or additionally, secondary reflectors 450 can be formed from a reflective material that only partially reflects light. For example, secondary reflectors 450 can be formed from a transparent material and a partially reflective coating (e.g., a partially silvered mirror). In this manner, luminaire system 400 can provide both direct illumination (i.e., light that propagates directly from the luminaire system to the target surface) and indirect illumination (i.e., light that propagates to the target surface after being redirected by the ceiling, for instance).

As described above, the housing 205 includes a U-shaped portion arranged with its opening toward the positive z-axis, and two support portions 207 formed on outside surfaces of the arms of the U-shaped portion of the housing 205. Each of the two support portions 207 of the housing 205 is formed from a pair of flanges. The pair of flanges of each support portion 207 is configured to fasten a respective secondary reflector 450 sandwiched between the pair of flanges. The substrate 112 is coupled with the inside surface of the base of the U-shaped portion of the housing 205. In some implementations, the optical coupler 320 can be attached to inside surfaces of the arms of the U-shaped portion of the housing 205. In the example shown in FIGS. 4A-4B, the housing 205 further includes an interconnecting portion 401 that can be used to attach the luminaire system 400 to a frame, a ceiling or to other structures of a room, a bay, a garage, etc., where the luminaire system is to be installed.

As in the case of the luminaire system 200, the housing 205 may also function as a heat sink for the luminaire system 400. For example, the housing 205 may function as a passive heat exchanger that cools the luminaire system 400 by dissipating heat into the surrounding medium. As such, in some implementations, the housing 205 is formed from a single material/alloy that has a high thermal conductivity to facilitate heat dissipation. In other implementations, the housing 205 is formed from a base material, providing mechanical strength (e.g., plastic that has been machined, molded, or extruded), coated with a layer of material (e.g., a metal or metal alloy) having a high thermal conductivity to facilitate heat dissipation. The latter implementation of the housing 205 is described in detail below.

Figure 5A:
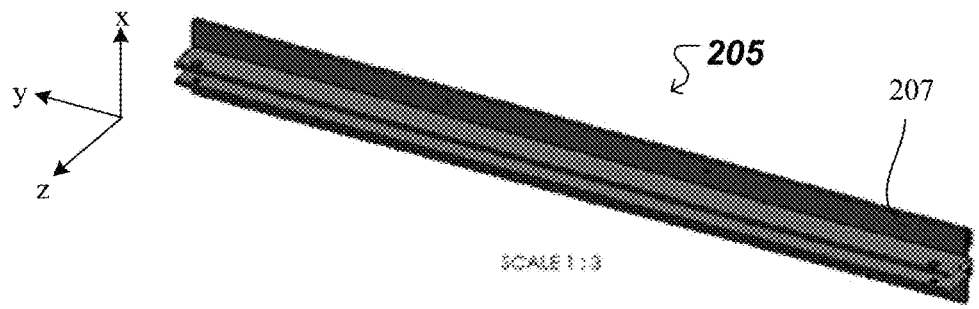
FIGS. 5A-5C show aspects of a housing of luminaire systems like the ones shown in FIG. 2A-2B or 4A-4B.
Figure 5B:
Figure 5C:
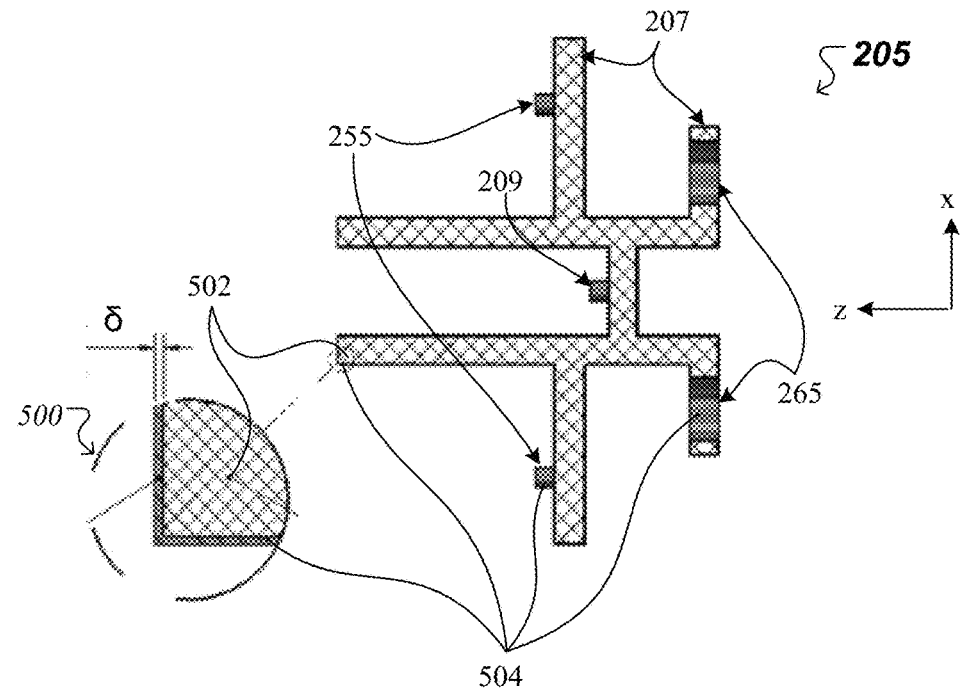

FIG. 5A is a perspective view, FIG. 5B is a plan view and FIG. 5C is a side cross-section of an example of a housing 205 used in luminaire systems 200 or 400. Here, the housing 205 is formed from an injection-molded plastic 502 plated with a layer of copper 504. The thickness of the copper layer 504 may vary depending on the specific thermal requirements of a given implementation. In some embodiments, the copper layer 504 may be relatively thin. Without wishing to be bound by theory, it is believed that a relatively thin, such as about 10% or less or 2% or less (e.g., about 1% or less, about 0.5% or less, about 0.1% or less, such as about 0.05%) than a thickness of the injection molded plastic 502 may provide adequate heat dissipation, as shown in the inset 500 of FIG. 5C. The copper layer may have a thickness of about 1 mm or less (e.g., 0.5 mm or less, 0.1 mm or less, 0.05 mm or less).

With continued reference to FIG. 5C, the housing 205 includes a U-shaped portion arranged with its opening toward the positive z-axis, and two support portions 207 formed on outside surfaces of the arms of the U-shaped portion of the housing 205. Each of the two support portions 207 of the housing 205 is formed from a pair of flanges. Pin-hole combinations 255 on each of the pairs of flanges of each support portion 207 are configured to fasten a respective secondary reflector 250 by attaching an end of the secondary reflector to one or more of the flanges. Openings 265 are configured to allow attaching the housing to other components.

The substrate 112 of the luminaire assemblies 100/100'/100* or the hollow luminaire assembly 300 can be coupled with the inside surface of the base of the U-shaped portion of the housing 205 using a pin 209 and a corresponding hole on the substrate 112. Moreover, the light guide 130 of the luminaire assemblies 100/100'/100* or the optical coupler 320 of the hollow luminaire assembly 300 can be attached to inside surfaces of the arms of the U-shaped portion of the housing 205 using fastener-hole combinations (not shown in FIG. 5C.)

In some embodiments, the optical extractor may be configured to asymmetrically distribute light on either side of the light guide. Exemplary embodiments are described in U.S. Pat. No. 8,506,112 (see, e.g., the embodiments disclosed in FIGS. 13A-13E and 28 therein).

A number of embodiments have been disclosed. Other embodiments are in the following claims.

What is claimed is:

1. An illumination system comprising:
   a housing extending along a first direction, and including
      a dielectric core and a layer comprising a metal disposed on the dielectric core,
      wherein the dielectric core comprises
         a base portion oriented in a first plane that contains the first direction, and
         an arm portion oriented in a second plane that contains the first direction, wherein the base portion and the arm portion are integrally formed to define an L-shaped profile of the dielectric core in a transverse cross-section orthogonal to the first direction, and
         a support structure integrally formed with the arm portion and oriented parallel to the first plane,
      wherein a portion of the housing includes traces formed from the layer comprising the metal;
   a plurality of light-emitting elements (LEEs) secured to the portion of the housing which includes the traces, the light emitting elements being operatively connected to power via the traces and arranged along the first direction;
   one or more optical couplers extending in a forward direction orthogonal to the first direction, the optical couplers positioned to receive light emitted by the LEEs and configured to collimate the received light, wherein the optical couplers are mechanically connected with a portion of the housing which comprises the arm portion of the dielectric core;
a redirecting surface spaced apart from the one or more optical couplers at a first distance along the forward direction, the redirecting surface configured to reflect the collimated light as output light in a backward angular range; and
a reflector arranged and configured to reflect the output light in the backward angular range to an ambient environment as reflected light in a forward angular range, wherein an edge of the reflector is supported by the support structure of the dielectric core.

2. The illumination system of claim 1, further comprising:
a light guide that includes
a receiving end arranged and configured to receive the collimated light from the one or more optical couplers,
an output end optically coupled with the redirecting surface, and
two opposing side surfaces extending from the receiving end to the output end, the two opposing side surfaces arranged and configured to guide the collimated light from the receiving end in the forward direction toward the output end of the light guide; and
an optical extractor that includes
the redirecting surface, and
an output surface with a curved cross-section, the output surface arranged and configured to transmit the output light to the ambient environment in the backward angular range.

3. The illumination system of claim 2, wherein the portion of the housing which comprises the arm portion of the dielectric core is further configured to support the light guide.

4. The illumination system of claim 2, wherein the opposing side surfaces of the light guide are planar.

5. The illumination system of claim 2, wherein the opposing side surfaces of the light guide are parallel.

6. The illumination system of claim 1, wherein the light emitting elements are light-emitting diodes.

7. The illumination system of claim 6, wherein the light-emitting diodes are white light-emitting diodes.

8. The illumination system of claim 1, wherein the illumination system extends between about six inches and 48 inches in the first direction.

* * * * *